Aug. 16, 1932.         T. W. CASE         1,872,404
CAMERA SHUTTER
Filed March 4, 1927
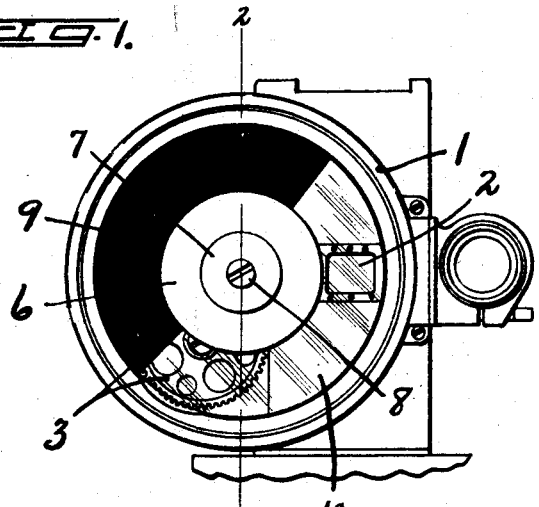
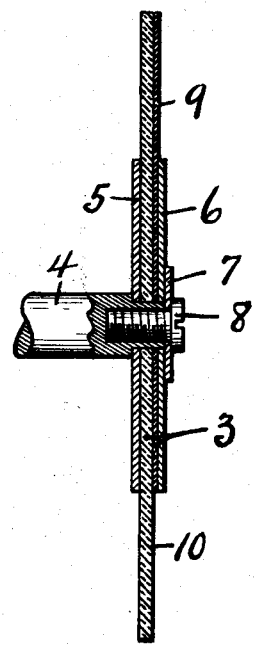
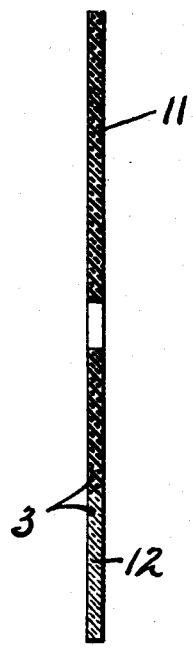
WITNESS
H. R. Hurst
INVENTOR
Theodore W. Case
BY Denison Thompson
ATTORNEYS.

Patented Aug. 16, 1932

1,872,404

UNITED STATES PATENT OFFICE

THEODORE WILLARD CASE, OF AUBURN, NEW YORK, ASSIGNOR TO CASE RESEARCH LAB. INC., OF AUBURN, NEW YORK, A CORPORATION OF NEW YORK

CAMERA SHUTTER

Application filed March 4, 1927. Serial No. 172,912.

This invention relates to certain new and useful improvements in cameras, and more specifically the invention resides in a new and novel camera shutter.

Heretofore motion picture cameras have included a metallic shutter which rotates at quite a high speed in front of the picture aperture, and these shutters have usually been in the form of a disk constituting one-half or more of a circle.

As this metallic shutter revolves, the opening which may vary in size passes over parts of the inside mechanism of the camera that are close to it, and then parts which are further away, and the shutter with its opening running into the resultant air pockets during its rotation suffers a reaction which affects its smoothness of rotation and its lack of smoothness in rotation, due to the fact that the shutter has a cut-out portion in the form of a sector, or perhaps half a circle, transmits an unevenness of motion to the other parts of the camera, with the result that where a portion of the camera is utilized as a part of an apparatus for producing a photographic record of light wave variations corresponding to sound wave variations, the resultant photographic record lacks somewhat in smoothness, and the record when reproduced does not accurately reproduce the original sounds.

The object of this invention, therefore, is to produce in the combination described, an efficient shutter for mounting in a motion picture camera and adapted for rotation over the picture aperture, and which shall consist of a thin ground circular disk of optical glass, a portion of which disk is opaque to the passage of light rays, and presenting a smooth continuous unbroken surface so that the smoothness of its rotary movement is not affected by operating conditions of the camera.

In the drawing:

Figure 1 is a front elevation of a portion of a moving picture camera with the usual turret plate removed and showing the shutter of this invention, photographing aperture and other portions of the mechanism.

Figure 2 is a section on line 2—2, Figure 1.

Figure 3 is a section through a modified and perhaps preferred form of shutter.

The camera parts illustrated in Figure 1 consist of a casing —1— within which the camera mechanism is mounted, such mechanism including the picture aperture —2— and the shutter —3—, the shutter being mounted for rotation with a rotary shaft —4— and clamped between a pair of spaced disks —5— and —6— mounted on the shaft —4— and held in position by a washer —7— and screw —8—.

In the structure of Figures 1 and 2 the shutter comprises a single integral thin ground disk of optical glass of circular form, and of uniform thickness throughout. This disk of glass has, as shown in Figure 1, approximately half its surface coated with an opaque layer —9— of any suitable material, and which may be applied in any suitable, and is preferably extremely thin just sufficient to render the desired portion of the glass disk —3— opaque. The other half —10— of the disk —3— remains in its transparent condition, and in operation conforms to the cut-out portion of the usual metallic shutter. Any desired proportion of the shutter —3— may be in the manner described rendered opaque.

In Figure 3 a disk similar to the disk —3—, Figures 1 and 2, is illustrated, the only differences in the structures being that a different method is utilized for rendering the desired portion of the disk opaque. In the illustration of Figure 3 the desired portion —11— of the disk is formed of opaque glass resultant from the materials used in its manufacture and the other portion —12— of the glass disk corresponding to the opening in the usual metallic shutter is left transparent, the essential feature of this invention residing in the use of a continuous disk having a portion corresponding to the usual metallic shutter which is rendered opaque in any suitable manner, and another portion corresponding to the cut-out section or opening in the usual metallic shutter, and which is left transparent for the passage of light rays, and altho I have shown and described specific structures as constituting embodiments of the invention I do not desire to restrict myself to the details of the same as various changes and modifications may be made within the scope of the appended claims.

I claim:

1. In combination, a shutter shaft for moving picture machines having a reduced end portion, a solid glass shutter disk having optically transparent and opaque portions and provided with a central aperture for snugly fitting on the reduced end portion of said shaft, bracing disks disposed on the reduced end of the shaft at opposite sides of the central portion of said shutter disk, and means to secure the bracing disks and shutter disk upon the shutter shaft in contiguous relation to turn with said shaft.

2. A motion picture camera including a picture aperture and a shutter rotatable over the aperture, said shutter consisting of a thin continuous disk having a uniformly opaque substantially semi-circular portion and a uniformly transparent substantially semi-circular portion, said portions being separated by a sharply defined line.

3. In combination, a shutter shaft for moving picture machines, a solid glass shutter disk, a continuous approximate one half of which is uniformly transparent and the other continuous approximate half of which is rendered uniformly opaque, and means for mounting said disk on the end portion of said shaft.

In witness whereof I have hereunto set my hand this 1st day of March, 1927.

THEODORE WILLARD CASE.